United States Patent
Yamagishi et al.

(10) Patent No.: US 9,475,925 B2
(45) Date of Patent: Oct. 25, 2016

(54) BLENDED RUBBER, BLENDED RUBBER COMPOSITION AND VULCANIZATE

(71) Applicant: DENKI KAGAKU KOGYO KABUSHIKI KAISHA, Tokyo (JP)

(72) Inventors: Uichiro Yamagishi, Itoigawa (JP); Hideki Toya, Itoigawa (JP); Satoru Ikari, Itoigawa (JP); Yasushi Abe, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/780,365

(22) PCT Filed: Mar. 28, 2014

(86) PCT No.: PCT/JP2014/059077
§ 371 (c)(1),
(2) Date: Sep. 25, 2015

(87) PCT Pub. No.: WO2014/157602
PCT Pub. Date: Oct. 2, 2014

(65) Prior Publication Data
US 2016/0039999 A1  Feb. 11, 2016

(30) Foreign Application Priority Data

Mar. 28, 2013 (JP) .................. 2013-068504

(51) Int. Cl.
| | | |
|---|---|---|
| C08L 11/00 | (2006.01) | |
| C08F 236/18 | (2006.01) | |
| C08C 19/00 | (2006.01) | |
| C08K 3/04 | (2006.01) | |
| C08K 5/00 | (2006.01) | |
| C08K 5/18 | (2006.01) | |

(52) U.S. Cl.
CPC .............. *C08L 11/00* (2013.01); *C08C 19/00* (2013.01); *C08F 236/18* (2013.01); *C08K 3/04* (2013.01); *C08K 5/0016* (2013.01); *C08K 5/0025* (2013.01); *C08K 5/18* (2013.01); *C08L 2205/03* (2013.01)

(58) Field of Classification Search
CPC .... C08L 11/00; C08L 2205/03; C08C 19/00; C08F 236/18; C08K 3/04; C08K 5/0016; C08K 5/0025; C08K 5/18
See application file for complete search history.

(56) References Cited

U.S. PATENT DOCUMENTS

| | | | |
|---|---|---|---|
| 5,064,890 A | 11/1991 | Tsurumaru et al. | ......... 524/209 |
| 2014/0220279 A1* | 8/2014 | Tsukada et al. | ......... C08L 9/02 428/36.6 |

FOREIGN PATENT DOCUMENTS

| | | | |
|---|---|---|---|
| JP | 60-177043 A | 9/1985 | |
| JP | 63-60344 A | 3/1988 | |
| JP | 2000-86849 A | 10/2001 | |
| JP | 2002-39448 A | 2/2002 | |
| JP | 2006-307156 A | 11/2006 | |
| JP | 2008-195870 A | 8/2008 | |
| JP | 2009-275124 A | 11/2009 | |

OTHER PUBLICATIONS

Written Opinion of the International search Authority dated Apr. 22, 2014, issued to International Application No. PCT/JP2014/059077.
International Search Report dated Apr. 22, 2014, issued to International Application No. PCT/JP2014/059077.

* cited by examiner

*Primary Examiner* — Nathan M Nutter
(74) *Attorney, Agent, or Firm* — Stein IP, LLC

(57) ABSTRACT

Provided are a blended rubber and a blended rubber composition that give a vulcanizate superior in abrasion resistance and ozone resistance, and a vulcanizate prepared by vulcanizing the blended rubber composition. A blended rubber, comprising 30 to 93 mass % of a chloroprene rubber, 5 to 50 mass % of a soft polyvinyl chloride, and 2 to 20 mass % of an acrylonitrile-butadiene rubber. The polyvinyl chloride resin used preferably has a polymerization degree of 300 to 3000 and the acrylonitrile-butadiene rubber preferably has an acrylonitrile content of 18 to 50 mass %.

20 Claims, No Drawings

BLENDED RUBBER, BLENDED RUBBER COMPOSITION AND VULCANIZATE

CROSS-REFERENCE TO RELATED APPLICATIONS

This application is a national stage of International Application No. PCT/JP2014/059077, filed Mar. 28, 2014, which claims the benefit of priority to Japanese Application No. 2013-068504, filed Mar. 28, 2013, in the Japanese Patent Office, the disclosures of which are incorporated herein by reference.

TECHNICAL FIELD

The present invention relates to a blended rubber, a blended rubber composition containing the blended rubber, and a vulcanizate therefrom. More specifically, it relates to a blended rubber that can be used as industrial rubber components such as automobile sealing materials, hose materials, molded rubber articles, gaskets, industrial cables, and industrial conveyor belts after vulcanization, a blended rubber composition containing the blended rubber, and a vulcanizate prepared by vulcanizing the blended rubber composition.

BACKGROUND ART

Chloroprene rubbers, which are superior in mechanical properties, weather resistance, flame resistance, and others, have been used widely as materials for industrial rubber products. Under increasingly severe demand in performance to these industrial rubber products, there exists a need for a chloroprene rubber that is improved in abrasion resistance and ozone resistance yet retaining these properties.

Known as the means of improving the abrasion resistance of chloroprene rubbers are a means of polymerizing chloroprene monomers using an alkylxanthogen sulfide as chain-transfer agent (see Patent Document 1) and a means of forming a chloroprene rubber by polymerization and plasticizing the rubber in the presence of a tetraalkylthiuram disulfide having 3 to 7 carbon atoms during plasticization (see Patent Document 2).

Also known as the technology for improving the ozone resistance of chloroprene rubbers is a means of adding a thiazole compound, thiuram compound, or thiourea compound to a rubber composition containing a chloroprene rubber and an ethylene-propylene-diene copolymer rubber (see Patent Document 3).

CITATION LIST

Patent Literatures

[Patent Document 1] JP-A No. 2006-307156
[Patent Document 2] JP-A No. 2009-275124
[Patent Document 3] JP-A No. 2008-195870

SUMMARY OF INVENTION

Technical Problem

The chloroprene rubbers obtained by the means described above are improved in abrasion resistance and ozone resistance. However for use as industrial rubber products, particularly as automobile rubber components, there has been a need for a rubber that is further improved in abrasion resistance and ozone resistance yet retaining the properties of the chloroprene rubbers described above.

Accordingly, an object of the present invention is to provide a blended rubber that gives a vulcanizate superior in abrasion resistance and ozone resistance, a blended rubber composition containing the blended rubber, and a vulcanizate prepared by vulcanization of the blended rubber composition.

Solution to Problem

The present invention provides a blended rubber comprising 30 to 93 mass % of a chloroprene rubber, 5 to 50 mass % of a soft polyvinyl chloride obtained by plasticizing a polyvinyl chloride with a plasticizer, and 2 to 20 mass % of an acrylonitrile-butadiene rubber.

The polyvinyl chloride may have a polymerization degree of 300 to 3000.

The soft polyvinyl chloride may be a polymer obtained by plasticizing 100 parts by mass of the polyvinyl chloride with 30 to 150 parts by mass of the plasticizer described above.

The plasticizer may be at least one compound selected from phthalic ester-, adipic acid-, chlorinated paraffin-, sebacic acid-, polyester-, phosphate ester-, polyether ester-, and trimellitic acid-based plasticizers.

The acrylonitrile-butadiene rubber may contain acrylonitrile at a rate of 18 to 50 mass %.

The present invention also provides a blended rubber composition comprising the blended rubber described above and a vulcanization accelerator.

The blended rubber composition may contain the vulcanization accelerator in an amount of 0.5 to 5 parts by mass with respect to 100 parts by mass of the blended rubber.

The vulcanization accelerator contained then may be at least one compound selected from thiourea compounds, guanidine compounds, thiuram compounds, thiazole compounds, and peroxides. The vulcanization accelerator may then contain a thiuram compound and a thiazole compound.

The present invention also provides a vulcanizate obtained by vulcanizing the blended rubber composition described above.

Advantageous Effects of Invention

The present invention provides a vulcanizate superior in abrasion resistance and ozone resistance after vulcanization.

DESCRIPTION OF EMBODIMENTS

Hereinafter, favorable embodiments of the invention will be described in detail. However, it should be understood that the present invention is not limited to the embodiments below.

First Embodiment

Blended Rubber

First of all, a blended rubber in the first embodiment of the present invention will be described. The blended rubber of the present embodiment contains (1) 30 to 93 mass % of a chloroprene rubber, (2) 5 to 50 mass % of a soft polyvinyl chloride, and (3) 2 to 20 mass % of an acrylonitrile-butadiene rubber as major components. Hereinafter, each component will be described in detail.

(1) Chloroprene Rubber

The chloroprene rubber contained in the blended rubber of the present embodiment has a chloroprene polymer as major component. The chloroprene polymer is a homopolymer of 2-chloro-1,3-butadiene (hereinafter, referred to as chloroprene) or a copolymer of chloroprene and other monomers. Examples of the monomers copolymerizable with chloroprene include acrylic acid esters such as methyl acrylate, butyl acrylate, and 2-ethylhexyl acrylate; methacrylic acid esters such as methyl methacrylate, butyl methacrylate, and 2-ethylhexyl methacrylate; hydroxy(meth)acrylates such as 2-hydroxyethyl(meth)acrylate, 2-hydroxymethyl(meth)acrylate, and 2-hydroxypropyl(meth)acrylate; 2,3-dichloro-1,3-butadiene, 1-chloro-1,3-butadiene, butadiene, isoprene, ethylene, styrene, acrylonitrile, and the like.

The monomer copolymerizable with chloroprene is not limited to a single monomer and may be, for example, a copolymer of three or more monomers including chloroprene. The polymer structure of the chloroprene polymer is also not particularly limited.

The chloroprene rubbers contained in the blended rubbers of the present embodiment are classified into mercaptan-, xanthogen-, and sulfur-modified chloroprene rubbers. Any one of these chloroprene rubbers may be used in the present embodiment.

The sulfur-modified chloroprene rubbers are, as will be described below, those prepared as the molecular weight of the chloroprene rubber is adjusted using a thiuram compound such as tetraethylthiuram disulfide, tetrabutylthiuram disulfide, or tetrakis(2-ethylhexyl)thiuram disulfide during polymerization of chloroprene monomers. The sulfur-modified chloroprene rubbers are characteristically superior in mechanical strength and also dimensional stability of the blended rubber composition, as compared to other modified chloroprene rubbers. It is thus possible by using a sulfur-modified chloroprene rubber to obtain a blended rubber composition improved in mechanical strength and dimensional stability.

The mercaptan-modified chloroprene rubbers are, as will be described below, those obtained as the molecular weight of the chloroprene rubber is adjusted using an alkylmercaptan such as n-dodecylmercaptan, t-dodecyloctylmercaptan, or octylmercaptan during polymerization of chloroprene monomers. The mercaptan-modified chloroprene rubbers are characteristically superior in adhesiveness to metals, as compared with other modified chloroprene rubbers. It is thus possible by using a mercaptan-modified chloroprene rubber to prepare a blended rubber composition and a vulcanizate improved in adhesiveness to metals.

The xanthogen-modified chloroprene rubbers are, as will be described below, those obtained as the molecular weight of the chloroprene rubber is adjusted using an alkylxanthogen compound during polymerization of chloroprene monomers. The xanthogen-modified chloroprene rubbers are characteristically superior in mechanical properties such as tensile strength and elongation at break, as compared with other modified chloroprene rubbers. It is thus possible by using a xanthogen-modified chloroprene rubber to prepare a composite composition and a vulcanizate improved in these mechanical properties.

It is possible by using the sulfur-, mercaptan-, and xanthogen-modified chloroprene rubbers in combination to adjust favorably the properties of the blended rubber composition and vulcanizate (molded vulcanized foam) according to their applications.

[Preparation of Chloroprene Rubber]

The chloroprene rubber contained in the blended rubber of the present embodiment is prepared by emulsion-polymerizing raw monomers containing chloroprene as major component, using rosin as the emulsifying dispersant, for example.

Examples of the catalysts for the polymerization reaction include inorganic peroxides such as potassium persulfate, organic peroxides such as ketone peroxides, peroxyketals, hydroperoxides, dialkyl peroxides, and diacyl peroxides. Examples of the catalyst-activating agents used include sodium sulfite, potassium sulfite, iron (II) oxide, anthraquinone, sodium 6-sulfonate, formamidinesulfonic acid, L-ascorbic acid, and the like.

The polymerization initiator used may be, but is not particularly limited to, a polymerization initiator commonly used in emulsion polymerization of chloroprene. Specifically, persulfate salts such as potassium persulfate and organic peroxides such as t-butyl hydroperoxide are used favorably.

The chain-transfer agent used may be, but is not particularly limited to, a chain-transfer agent commonly used in emulsion polymerization of chloroprene. Specifically, known chain-transfer agents including long-chain alkylmercaptans such as n-dodecylmercaptan, tert-dodecylmercaptan, and n-octylmercaptan, dialkylxanthogen disulfides such as diisopropylxanthogen disulfide and diethylxanthogen disulfide, and iodoform are used favorably.

The polymerization terminator that is added for termination of polymerization may be, but is not particularly limited to, a polymerization terminator commonly used. Examples thereof favorably used include phenothiazine, para-t-butylcatechol, hydroquinone, hydroquinone monomethyl ether, diethylhydroxylamine, thiodiphenylamine, 1,3,5-trihydroxybenzene, and the like.

The polymerization temperature for the chloroprene latex may be, but is not particularly limited, in the range at which emulsion polymerization is generally carried out. The final polymerization rate of the chloroprene polymer (chloroprene rubber) obtained in the polymerization step described above is preferably adjusted, but not limited, in the range of 30 to 100%.

Unreacted monomers are then removed from the polymer solution obtained in the polymerization step (monomer removal). The method may be, but is not particularly limited to, a known method such as heating under reduced pressure. However, the final polymerization rate of the chloroprene polymer is preferably 30% or more, when productivity is taken into consideration.

(2) Soft Polyvinyl Chloride

The soft polyvinyl chloride contained in the blended rubber of the present embodiment, which is added for improvement of the abrasion resistance and ozone resistance of the vulcanizate obtained, comprises polyvinyl chloride and a plasticizer. The soft polyvinyl chloride preferably comprises a polyvinyl chloride having a polymerization degree in the range of 300 to 3000, as it is effective in improving the abrasion resistance and ozone resistance of the vulcanizate obtained. More preferably, the polymerization degree is 500 or more. More preferably, the polymerization degree is 2500 or less.

The soft polyvinyl chloride is prepared by adding a plasticizer, together with a lubricant and an antioxidant agent, to a polyvinyl chloride. The polyvinyl chloride used may be any one of polyvinyl chlorides having a wide range of polymerization degree and is, for example, a commercially available polyvinyl chloride. The plasticizers used in preparation of the soft polyvinyl chloride include phthalic ester-, adipic acid-, chlorinated paraffin-, sebacic acid-, polyester-, phosphate ester-, polyether ester-, and trimellitic acid-based plasticizers and the like and these plasticizers may be used alone or in combination of two or more.

Typical examples of the phthalic ester-based plasticizers include diisononyl phthalate, dibutyl phthalate, dioctyl phthalate, diundecyl phthalate, and the like. Typical examples of the adipic acid-based plasticizers include dioctyl adipate, dibutyl adipate, diisononyl adipate, diisodecyl adipate, and the like.

The chlorinated paraffin-based plasticizer is typically a C10 to C30 chlorinated paraffin having a chlorination rate of 40 to 70%. The chlorination rate can be determined by the oxygen flask method according to JIS-K7229. Typical examples of the sebacic acid-based plasticizers include dioctyl sebacate, dimethyl sebacate, diethyl sebacate, dibutyl sebacate, diisopropyl sebacate, dicapryl sebacate, and the like.

The polyester-based plasticizer is typically an adipic acid-based polyester, a phthalic acid-based polyester, or the like. Typical examples of the phosphate ester-based plasticizers include tricresyl phosphate, tributyl phosphate, trixylenyl phosphate, tris(2-ethylhexyl) phosphate, triphenyl phosphate, cresyl diphenyl phosphate, and the like.

Examples of the polyether ester-based plasticizers include adipate ether ester-, epoxy ester-, and phthalate ether ester-based plasticizers and the like. Typical examples of the trimellitic acid-based plasticizers include trimethyl trimellitate, tris-2-ethylhexyl trimellitate, isononyl trimellitate, isooctyl trimellitate, and the like.

The amount of the plasticizer added to the soft polyvinyl chloride contained in the blended rubber of the present embodiment is preferably 30 to 150 parts by mass with respect to 100 parts by mass of the polyvinyl chloride. The amount of the plasticizer is more preferably 50 parts by mass or more. The amount of the plasticizer is more preferably 120 parts by mass or less. The plasticizer, when the content thereof is in the range above, can plasticize the polyvinyl chloride sufficiently and does not cause bleeding out of the resulting vulcanizate on the surface. Known examples of such a soft polyvinyl chloride include soft polyvinyl chloride resins manufactured by Mitsubishi Chemical Corporation, and the like.

(3) Acrylonitrile-Butadiene Rubber

An acrylonitrile-butadiene rubber, which is a copolymer of acrylonitrile and 1,3-butadiene, is added for improvement of the ozone resistance and the mechanical strength of the vulcanizate obtained. The acrylonitrile-butadiene rubber used may be a known polymer having an arbitrary polymerization degree and may be, for example, a commercially available acrylonitrile-butadiene rubber.

Acrylonitrile-butadiene rubbers are classified into low-nitrile rubbers having an acrylonitrile content of less than 25 mass %, medium-nitrile rubbers having an acrylonitrile content of 25 mass % or more and 35 mass % or less, and high-nitrile rubbers having an acrylonitrile content of more than 35 mass %.

Among the acrylonitrile-butadiene rubbers above, those having an acrylonitrile content in the range of 18 mass % to 50 mass % with respect to the entire acrylonitrile-butadiene rubber are used favorably in the blended rubber of the present embodiment. The acrylonitrile content is more preferably 45 mass % or less. An acrylonitrile-butadiene rubber having an acrylonitrile content in the range above, when used, is effective in improving the ozone resistance and the mechanical strength of the vulcanizate obtained.

The blended rubber is prepared by kneading (1) the chloroprene rubber, (2) the soft polyvinyl chloride, and (3) the acrylonitrile-butadiene rubber described above as major components. The blending rates of the chloroprene rubber, the soft polyvinyl chloride, and the acrylonitrile-butadiene rubber are respectively in the ranges of 30 to 93 mass %, 5 to 50 mass %, and 2 to 20 mass %. The rate of the chloroprene rubber is preferably 50 mass % or more. The rate of the chloroprene rubber is more preferably 90 mass % or less. The rate of the soft polyvinyl chloride resin is preferably 5 mass % or more. The rate of the soft polyvinyl chloride is more preferably 30 mass % or less. The rate of the acrylonitrile-butadiene rubber is preferably 5 mass % or more. The rate of the acrylonitrile-butadiene rubber is more preferably 20 mass % or less.

When the content of the chloroprene rubber is larger than the range above, the vulcanizate obtained shows deterioration in ozone resistance. Alternatively when the content of the soft polyvinyl chloride is larger than the range above, the vulcanizate obtained shows deterioration in tensile strength. When the content of the acrylonitrile-butadiene rubber is larger than the range above, the vulcanizate obtained shows deterioration in heat resistance. The blending rate is substantially identical with the content rate of the chloroprene rubber, the soft polyvinyl chloride, and the acrylonitrile butadiene in the blended rubber of the present embodiment.

In blending a chloroprene rubber, a soft polyvinyl chloride, and an acrylonitrile-butadiene rubber, the chloroprene rubber, the soft polyvinyl chloride, and the acrylonitrile-butadiene rubber are kneaded in a known tightly-sealed mixer.

As described above in detail, the blended rubber of the present embodiment, which contains particular amounts of a chloroprene rubber, a soft polyvinyl chloride, and an acrylonitrile-butadiene rubber, gives a vulcanizate superior in abrasion resistance and ozone resistance. In particular, it is possible to improve the abrasion resistance and ozone resistance of the obtained vulcanizate by controlling the polymerization degree of the polyvinyl chloride contained in the soft polyvinyl chloride in the range of 300 to 3000. It is also possible to improve the mechanical strength of the obtained vulcanizate by making the acrylonitrile-butadiene rubber contain acrylonitrile at a rate of 18 to 50 mass %.

Second Embodiment

Blended Rubber Composition

Hereinafter, the blended rubber composition in the second embodiment of the present invention will be described. The blended rubber composition of the present embodiment comprises the blended rubber obtained by the method described above and a vulcanization accelerator.

[Vulcanization Accelerator]

The vulcanization accelerator contained in the blended rubber composition of the present embodiment can accelerate vulcanization of the blended rubber composition obtained. Thiourea compounds, guanidine compounds, thiuram compounds, thiazole compounds, peroxides, and the like are used alone or in combination of two or more as the vulcanization accelerator.

Examples of the thiourea compounds include ethylene thiourea, diethylthiourea, trimethylthiourea, triethylthiourea, N,N'-diphenylthiourea, and the like.

Typical examples of the guanidine compounds include guanidine, 1,3-diphenylguanidine, di-o-tolylguanidine, di-m-tolylguanidine, 1-(o-tolyl)biguanide, 1-(m-tolynbiguanide, 1-(p-tolynbiguanide, di-o-triguanidine salt of dicatechol borate, di-m-tolylguanidine salt of dicatechol borate, di-p-triguanidine salt of dicatechol borate, guanidine hydrochloride, guanidine nitrate, guanidine carbonate, guanidine phosphate, guanidine sulfamate, formylguanidine, acetylguanidine, chloroacetylguanidine, 1,2-n-diacetylguanidine, 1,3-n-diacetylguanidine, 1,3-n-dipropionylguanidine, hippurylguanidine, benzenesulfonylguanidine, and the like.

Examples of the thiuram compounds include tetramethylthiuram disulfide, tetraethylthiuram disulfide, tetrabutylthiuram disulfide, dipentamethylthiuram tetrasulfide, tetramethylthiuram monosulfide, tetrabenzylthiuram disulfide, tetrakis-2-ethylhexylthiuram disulfide, and the like.

Examples of the thiazole compounds include 2-mercaptobenzothiazole, benzothiazolyl disulfide, di-2-benzothiazolyl disulfide, 2-mercaptobenzothiazole zinc salt, 2-morpholinodithiobenzothiazole, N-cyclohexyl-2-benzothiazolylsulphenamide, N,N-dicyclohexyl-2-benzothiazolylsulphenamide, 1-(N,N-diethylthiocarbamoylsulfanyl)-1,3-benzothiazole, and the like.

Examples of the peroxides include dicumyl peroxides, valerate peroxides, C1 to C8 alkyl peroxides, aromatic peroxides substituted with C1 to C8 alkyl groups that may be substituted with chloro groups, and the like.

The dicumyl peroxide is not particularly limited, if it is a peroxide having two cumyl groups and examples thereof include dicumyl peroxide and the like.

The valerate peroxide is not particularly limited, if it is a valerate-based peroxide having valerate groups and examples thereof include n-butyl 4,4-di(t-butylperoxy)valerate and the like.

The alkyl peroxide is not particularly limited, if it is a peroxide having one or more C1 to C8 alkyl groups and examples thereof include 2,5-dimethyl-2,5-di(t-butylperoxy) hexane, 1,1-di(t-butylperoxy)cyclohexane, t-butyl peroxide, t-butyl hydroperoxide, 1,1-di-(t-butylperoxy)-3,3,5-trimethylcyclohexane, di-t-butylperoxy-isopropylbenzene, 2,5-dimethyl-2,5-di(t-butylperoxy)hexyne, 2,5-dimethyl-2,5-di(t-butylperoxy)hexane, 2,2-bis(t-butylperoxy)-4-diisopropylbenzene, 1,3-bis(t-butylperoxy)-4-diisopropylbenzene, and the like.

The aromatic peroxide substituted with alkyl groups that may be substituted with chloro groups is not particularly limited, if it is a peroxide having one or more aromatic moieties substituted with C1 to C8 alkyl groups that may be substituted with chloro groups and examples thereof include t-butyl cumyl peroxide, α,α'-di(t-butylperoxy)diisopropylbenzene, benzoyl peroxide, 2,4-dichloro-benzoyl peroxide, and the like.

When a peroxide is used as the vulcanization accelerator contained in the blended rubber composition of the present embodiment, the blended rubber composition preferably contains a crosslinking aid. The crosslinking aid, which is added with the peroxide for efficient vulcanization of the blended rubber composition obtained, is preferably at least one compound selected from bifunctional or trifunctional ester compounds. Specifically, trimethylolpropane, ethylene glycol dimethacrylate, triallyl isocyanate, phenylene dimaleimide, or the like is used.

Among the vulcanization accelerators described above, a vulcanization accelerator containing a thiuram compound and a thiazole compound is favorably used, as it is more effective in accelerating vulcanization of the blended rubber composition of the present embodiment.

The addition amount of the vulcanization accelerator contained in the blended rubber composition of the present embodiment is preferably 0.5 to 5 parts by mass, more preferably, 0.7 parts by mass or more, with respect to 100 parts by mass of the blended rubber. When at least one compound selected from thiourea compounds, guanidine compounds, thiuram compounds, and thiazole compounds is used as the vulcanization accelerator, the addition amount thereof is more preferably 2 parts by mass or less. It is then, more preferably 1.5 parts by mass or less. When the addition amount of the vulcanization accelerator is less than 0.5 parts by mass, the blended rubber composition obtained may not be vulcanized sufficiently. Alternatively when the addition amount of the vulcanization accelerator is more than 5 parts by mass, the vulcanizate obtained may become excessively higher in hardness, losing its rubber elasticity.

The blended rubber composition is obtained by kneading the blended rubber and the vulcanization accelerator described above at a temperature not higher than the vulcanization temperature of the blended rubber. Examples of the kneading machines include Banbury mixers, Nyder mixers, tow-roll mixers and the like.

[Other Compounds]

The blended rubber composition may contain, in addition to the vulcanization accelerator, additives such as carbon black, plasticizers, vulcanizing agents, fillers or reinforcing agents other than carbon black, processing aids, and antioxidant agents.

As described above in detail, the blended rubber composition of the present embodiment, which contains the blended rubber of the first embodiment described above, gives a vulcanizate superior in abrasion resistance and ozone resistance. In particular, the blended rubber composition of the present embodiment, which contains a particular vulcanization accelerator, can accelerate vulcanization of the blended rubber composition, giving a vulcanizate superior in abrasion resistance and ozone resistance.

Third Embodiment

Vulcanizate

Hereinafter, the vulcanizate in the third embodiment of the present invention will be described. The vulcanizate of the present embodiment is prepared by molding and vulcanizing the blended rubber composition in the second embodiment of the present invention obtained by the method described above into a desired shape or by vulcanizing the blended rubber composition and then molding the vulcanizate into a desired shape. The methods of molding the composite composition or the vulcanizate include press molding, extrusion molding, calendering, and the like.

The vulcanization temperature of the blended rubber composition can be determined properly according to the composition and is normally in the range of 140 to 220° C., preferably in the range of 150 to 180° C. The vulcanizing period is also determined properly according to the composition and the shape of the blended rubber composition and is normally in the range of 10 to 60 minutes.

The vulcanizate of the present embodiment that is obtained by vulcanizing the blended rubber composition of the second embodiment described above is superior in abrasion resistance and ozone resistance.

EXAMPLES

Hereinafter, advantageous effects of the present invention will be described specifically with reference to Examples and Comparative Examples of the present invention.

(Preparation of Sulfur-Modified Chloroprene Rubber)

130 parts by mass of purified water, 4 parts by mass of rosin acid sodium salt, 0.5 parts by mass of 6-naphthalenesulfonic acid formalin, 96 parts by mass of 2-chloro-1,3-butadiene, 4 parts by mass of 2,3-dichloro-1,3-butadiene, 0.3 parts by mass of sulfur, and other chemicals were placed in a four-necked flask having a capacity of 5 liters and the mixture was polymerized under nitrogen atmosphere using potassium persulfate as initiator. When the monomer conversion rate reached 65%, thiodiphenylamine was added thereto, to terminate polymerization. Unreacted monomers were then removed by a common steam trapping method, to give a polychloroprene latex. The terminal molecular chains of the polychloroprene latex obtained were cleaved and depolymerized with a plasticizer consisting of tetramethylthiuram disulfide and at least one compound selected from the tetraalkylthiuram disulfides represented by the following Chemical Formula 1 (wherein, $R_1$ represents an alkyl group having 2 to 7 carbon atoms) and the dialkyldithiocarbamic acid salts represented by the following Chemical Formula 2 (wherein, $R_2$ represents an alkyl group having 1 to 7 carbon atoms), to give a polymer containing shortened polymer molecular chains suitable for molding and having a Mooney viscosity in a suitable range. The polychloroprene latex obtained was processed by a common freeze-solidification-drying method, to give a sulfur-modified chloroprene rubber.

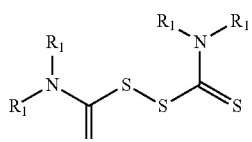

[C.1]

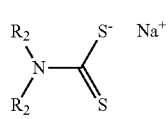

[C.2]

(Preparation of Mercaptan-Modified Chloroprene Rubber)

130 parts by mass of purified water, 4 parts by mass of rosin acid sodium salt, 0.5 parts by mass of β-naphthalenesulfonic acid formalin, 96 parts by mass of 2-chloro-1,3-butadiene, 4 parts by mass of 2,3-dichloro-1,3-butadiene, 0.3 parts by mass of n-dodecylmercaptan, and other chemicals were placed in a four-necked flask having a capacity of 5 liters and the mixture was polymerized under nitrogen atmosphere using potassium persulfate as initiator. When the monomer conversion rate reached 65%, thiodiphenylamine was added to terminate polymerization. Unreacted monomers were then removed by a common steam-trapping method, to give a polychloroprene latex. The polychloroprene latex obtained was processed with a common freeze-solidification-drying method, to give a mercaptan-modified chloroprene rubber.

(Preparation of Xanthogen-Modified Chloroprene Rubber)

130 parts by mass of purified water, 4 parts by mass of rosin acid sodium salt, 0.5 parts by mass of 6-naphthalenesulfonic acid formalin, 96 parts by mass of 2-chloro-1,3-butadiene, 4 parts by mass of 2,3-dichloro-1,3-butadiene, 0.3 parts by mass of an alkylxanthogen compound, and other chemicals were placed in a four-necked flask having a capacity of 5 liters and the mixture was polymerized under nitrogen atmosphere using potassium persulfate as initiator. When the monomer conversion rate reached 65%, thiodiphenylamine was added to terminate polymerization. Unreacted monomers were then removed by a common steam-trapping method, to give a polychloroprene latex. The polychloroprene latex obtained was processed with a common freeze-solidification-drying method, to give a xanthogen-modified chloroprene rubber.

(Preparation of Soft Polyvinyl Chloride a)

Soft polyvinyl chloride a was prepared by kneading 100 parts by mass of a polyvinyl chloride having a polymerization degree of 800, 100 parts by mass of diisononyl phthalate as phthalic ester-based plasticizer, and additionally 1 part by mass of stearic acid and 1 part by mass of phenol-based antioxidant agent as other additives in a Brabender kneader.

(Preparation of Soft Polyvinyl Chloride b)

Soft polyvinyl chloride b was prepared similarly to the soft polyvinyl chloride a, except that the plasticizer used in preparation of the soft polyvinyl chloride a was replaced with 100 parts by mass of dioctyl adipate.

(Preparation of Soft Polyvinyl Chloride c)

Soft polyvinyl chloride c was prepared similarly to the soft polyvinyl chloride a, except that the plasticizer used in preparation of the soft polyvinyl chloride a was replaced with 100 parts by mass of a chlorinated paraffin (Empara 70, produced by Ajinomoto Fine-Techno Co., Inc.).

(Preparation of Soft Polyvinyl Chloride d)

Soft polyvinyl chloride d was prepared similarly to the soft polyvinyl chloride a, except that the plasticizer used in preparation of the soft polyvinyl chloride a was replaced with 100 parts by mass of dioctyl sebacate.

(Preparation of Soft Polyvinyl Chloride e)

Soft polyvinyl chloride e was prepared similarly to the soft polyvinyl chloride a, except that the plasticizer used in preparation of the soft polyvinyl chloride a was replaced with 100 parts by mass of ADEKACIZER RS-107 (a polyether ester-based plasticizer, manufactured by ADEKA Corporation).

(Preparation of Soft Polyvinyl Chloride f)

Soft polyvinyl chloride f was prepared similarly to the soft polyvinyl chloride a, except that the plasticizer used in preparation of the soft polyvinyl chloride a was replaced with 100 parts by mass of tricresyl phosphate.

(Preparation of Soft Polyvinyl Chloride g)

Soft polyvinyl chloride g was prepared similarly to the soft polyvinyl chloride a, except that the plasticizer used in preparation of the soft polyvinyl chloride a was replaced with 100 parts by mass of trimethyl trimellitate.

(Preparation of Soft Polyvinyl Chloride h)

Soft polyvinyl chloride h was prepared similarly to the soft polyvinyl chloride a, except that the polyvinyl chloride used in preparation of the soft polyvinyl chloride a was replaced with that having a polymerization degree of 1500.

(Preparation of Soft Polyvinyl Chloride i)

Soft polyvinyl chloride i was prepared similarly to the soft polyvinyl chloride a, except that the polyvinyl chloride used in preparation of the soft polyvinyl chloride a was replaced with that having a polymerization degree of 3000.

(Preparation of Soft Polyvinyl Chloride j)

Soft polyvinyl chloride j was prepared similarly to the soft polyvinyl chloride a, except that the polyvinyl chloride used in preparation of the soft polyvinyl chloride a was replaced with that having a polymerization degree of 300.

Example 1

Preparation of Blended Rubber Composition 75 parts by mass of the mercaptan-modified chloroprene rubber obtained by the method described above, 20 parts by mass of the soft polyvinyl chloride a, 5 parts by mass of an acrylonitrile butadiene rubber A (acrylonitrile content: 40.5%), and additionally other additives (i.e., 1 part by mass of stearic acid, 1 part by mass of Octamine as an antioxidant agent, 4 parts by mass of magnesium oxide, 30 parts by mass of carbon black, and 5 parts by mass of zinc oxide) were kneaded in a pressure Banbury test machine. One part by mass of ethylene thiourea was added as vulcanization accelerator to the composition obtained and the mixture was kneaded using an 8-inch open roll, to give a blended rubber composition.

The blended rubber composition obtained was press-vulcanized under a condition of 160° C.×30 minutes, to give a sheet-shaped vulcanizate having a thickness of 2 mm. The abrasion resistance and the ozone resistance of the vulcanizate obtained were evaluated and the results are summarized in Table 1. Each test was performed in the following manner:

(1) Abrasion Resistance

The abrasion resistance test was performed according to JIS K6264-2 using a DIN abrasion tester manufactured by Toyo Seiki Seisaku-sho, Ltd. The DIN abrasion test was carried out, as a load of 10N was applied to the test piece and the test piece was rotated. A test piece having an abrasive wear of less than 200 mg was considered satisfactory.

(2) Ozone Resistance

The ozone resistance test was performed according to JIS K6259 using a UVC ozone aging tester manufactured by Toyo Seiki Seisaku-sho, Ltd., by holding the test piece, as it is extended by 20%, under an environment of a temperature of 40° C. and an ozone concentration of 50 pphm and determining the period until cracking was observed (up to 20 days). A test piece resistant to cracking for at least 10 days was considered satisfactory.

Examples 2 to 25 and Comparative Examples 1 to 3

Blended rubber compositions and vulcanizates were prepared similarly to Example 1, except that the kinds and the blending amounts of the chloroprene rubber, the soft polyvinyl chloride, the acrylonitrile-butadiene rubber, the vulcanization accelerator, and the crosslinking aid used in Example 1 were changed to those shown in Table 1 or 2 and the vulcanizates obtained were evaluated similarly to Example 1.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition Chloroprene rubber (parts by mass) | | | | | | | | | | | | | |
| Sulfur-modified chloroprene rubber | | | | | | | | | | | | | |
| Mercaptan-modified chloroprene rubber | 75 | 75 | 75 | 75 | 75 | 75 | 75 | 75 | 75 | 75 | 75 | 75 | 75 |
| Xanthogen-modified chloroprene rubber | | | | | | | | | | | | | |
| Soft polyvinyl chloride (parts by mass) | | | | | | | | | | | | | |
| Soft polyvinyl chloride a | 20 | | | | | | | | | | 20 | 20 | 20 |
| Soft polyvinyl chloride b | | 20 | | | | | | | | | | | |
| Soft polyvinyl chloride c | | | 20 | | | | | | | | | | |
| Soft polyvinyl chloride d | | | | 20 | | | | | | | | | |
| Soft polyvinyl chloride e | | | | | 20 | | | | | | | | |
| Soft polyvinyl chloride f | | | | | | 20 | | | | | | | |
| Soft polyvinyl chloride g | | | | | | | 20 | | | | | | |
| Soft polyvinyl chloride h | | | | | | | | 20 | | | | | |
| Soft polyvinyl chloride i | | | | | | | | | 20 | | | | |
| Soft polyvinyl chloride j | | | | | | | | | | 20 | | | |
| Acrylonitrile-butadiene rubber (parts by mass) | | | | | | | | | | | | | |
| Acrylonitrile butadiene rubber A (acrylonitrile content: 40.5%) | 5 | 5 | 5 | 5 | 5 | 5 | 5 | 5 | 5 | 5 | | | |
| Acrylonitrile butadiene rubber B (acrylonitrile content: 50.0%) | | | | | | | | | | | 5 | | |
| Acrylonitrile butadiene rubber C (acrylonitrile content: 33.0%) | | | | | | | | | | | | 5 | |
| Acrylonitrile butadiene rubber D (acrylonitrile content: 18.0%) | | | | | | | | | | | | | 5 |
| Vulcanization accelerator (parts by mass) | | | | | | | | | | | | | |
| Ethylene thiourea | 1 | 1 | 1 | 1 | 1 | 1 | 1 | 1 | 1 | 1 | 1 | 1 | 1 |
| Tetramethylthiuram disulfide | | | | | | | | | | | | | |
| N-Cyclohexyl-2-benzothiazolylsulphenamide | | | | | | | | | | | | | |
| Di-2-benzothiazolyl | | | | | | | | | | | | | |

TABLE 1-continued

|  | Example | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| disulfide | | | | | | | | | | | | | |
| Valerate peroxide (PERHEXA V-40, produced by NOF Corporation) | | | | | | | | | | | | | |
| Other additives (parts by mass) | | | | | | | | | | | | | |
| Stearic acid | 1 | 1 | 1 | 1 | 1 | 1 | 1 | 1 | 1 | 1 | 1 | 1 | 1 |
| Antioxidant agent | 1 | 1 | 1 | 1 | 1 | 1 | 1 | 1 | 1 | 1 | 1 | 1 | 1 |
| Magnesium oxide | 5 | 5 | 5 | 5 | 5 | 5 | 5 | 5 | 5 | 5 | 5 | 5 | 5 |
| Carbon black | 30 | 30 | 30 | 30 | 30 | 30 | 30 | 30 | 30 | 30 | 30 | 30 | 30 |
| Zinc oxide | 5 | 5 | 5 | 5 | 5 | 5 | 5 | 5 | 5 | 5 | 5 | 5 | 5 |
| Trimethylolpropane | | | | | | | | | | | | | |
| Evaluation | | | | | | | | | | | | | |
| Abrasion wear (mg) | 186 | 190 | 182 | 195 | 180 | 179 | 177 | 194 | 187 | 185 | 183 | 186 | 191 |
| Ozone resistance (day) | 20 | 20 | 20 | 20 | 20 | 20 | 20 | 20 | 20 | 20 | 20 | 20 | 20 |

TABLE 2

|  | Example | | | | | | | | | | | | Comparative Example | | |
|---|---|---|---|---|---|---|---|---|---|---|---|---|---|---|---|
|  | 14 | 15 | 16 | 17 | 18 | 19 | 20 | 21 | 22 | 23 | 24 | 25 | 1 | 2 | 3 |
| Composition Chloroprene rubber (parts by mass) | | | | | | | | | | | | | | | |
| Sulfur-modified chloroprene rubber | | 75 | | 35 | 35 | | | | | | | | | | |
| Mercaptan-modified chloroprene rubber | | | 40 | | 40 | 30 | 93 | 75 | 75 | 75 | 75 | 75 | 100 | 10 | 80 |
| Xanthogen-modified chloroprene rubber | 75 | | 35 | 40 | | | | | | | | | | | |
| Soft polyvinyl chloride (parts by mass) | | | | | | | | | | | | | | | |
| Soft polyvinyl chloride a | 20 | 20 | 20 | 20 | 20 | 50 | 5 | 20 | 20 | 20 | 20 | 20 | | 60 | 20 |
| Soft polyvinyl chloride b | | | | | | | | | | | | | | | |
| Soft polyvinyl chloride c | | | | | | | | | | | | | | | |
| Soft polyvinyl chloride d | | | | | | | | | | | | | | | |
| Soft polyvinyl chloride e | | | | | | | | | | | | | | | |
| Soft polyvinyl chloride f | | | | | | | | | | | | | | | |
| Soft polyvinyl chloride g | | | | | | | | | | | | | | | |
| Soft polyvinyl chloride h | | | | | | | | | | | | | | | |
| Soft polyvinyl chloride i | | | | | | | | | | | | | | | |
| Soft polyvinyl chloride j | | | | | | | | | | | | | | | |
| Acrylonitrile-butadiene rubber (parts by mass) | | | | | | | | | | | | | | | |
| Acrylonitrile butadiene rubber A (acrylonitrile content 40.5%) | 5 | 5 | 5 | 5 | 5 | 20 | 2 | 5 | 5 | 5 | 5 | 5 | | 30 | |
| Acrylonitrile butadiene rubber B (acrylonitrile content: 50.0%) | | | | | | | | | | | | | | | |
| Acrylonitrile butadiene rubber C (acrylonitrile content: 33.0%) | | | | | | | | | | | | | | | |
| Acrylonitrile butadiene rubber D (acrylonitrile content: 18.0%) | | | | | | | | | | | | | | | |
| Vulcanization accelerator (parts by mass) | | | | | | | | | | | | | | | |
| Ethylene thiourea | 1 | 1 | 1 | 1 | 1 | 1 | 1 | | | | | 1 | 1 | 1 | 1 |
| Tetramethylthiuram disulfide | | | | | | | | 1 | | | | 0.5 | | | |
| N-Cyclohexyl-2-benzothiazolylsulphenamide | | | | | | | | | 1 | | | 0.5 | | | |
| Di-2-benzothiazolyl disulfide | | | | | | | | | | 1 | | | | | |

TABLE 2-continued

|  | Example | | | | | | | | | | | | Comparative Example | | |
|---|---|---|---|---|---|---|---|---|---|---|---|---|---|---|---|
|  | 14 | 15 | 16 | 17 | 18 | 19 | 20 | 21 | 22 | 23 | 24 | 25 | 1 | 2 | 3 |
| Valerate peroxide (PERHEXA V-40, produced by NOF Corporation) Other additives (parts by mass) |  |  |  |  |  |  |  |  |  |  | 5 |  |  |  |  |
| Stearic acid | 1 | 1 | 1 | 1 | 1 | 1 | 1 | 1 | 1 | 1 | 1 | 1 | 1 | 1 | 1 |
| Antioxidant agent | 1 | 1 | 1 | 1 | 1 | 1 | 1 | 1 | 1 | 1 | 1 | 1 | 1 | 1 | 1 |
| Magnesium oxide | 5 | 5 | 5 | 5 | 5 | 5 | 5 | 5 | 5 | 5 | 5 | 5 | 5 | 5 | 5 |
| Carbon black | 30 | 30 | 30 | 30 | 30 | 30 | 30 | 30 | 30 | 30 | 30 | 30 | 30 | 30 | 30 |
| Zinc oxide | 5 | 5 | 5 | 5 | 5 | 5 | 5 | 5 | 5 | 5 | 5 | 5 | 5 | 5 | 5 |
| Trimethylolpropane Evaluation |  |  |  |  |  |  |  |  |  |  | 1 |  |  |  |  |
| Abrasion wear (mg) | 194 | 168 | 191 | 172 | 175 | 195 | 181 | 189 | 186 | 185 | 171 | 160 | 188 | 230 | 262 |
| Ozone resistance (day) | 20 | 20 | 20 | 20 | 20 | 20 | 14 | 20 | 20 | 20 | 20 | 20 | 7 | 13 | 12 |

As shown in Tables 1 and 2, the vulcanizates obtained by vulcanization of the blended rubber compositions of Examples 1 to 25, which are within the scope of the present invention, were superior in abrasion resistance and ozone resistance. In particular, the vulcanizates of Examples 15, 17, and 18, which were prepared using a sulfur-modified chloroprene rubber as chloroprene rubber, were further superior in abrasion resistance. The vulcanizate of Example 24, which was prepared using a peroxide (valerate peroxide) as vulcanization accelerator, was further superior in abrasion resistance. The vulcanizate of Example 25, which was prepared using a thiuram compound (tetramethylthiuram disulfide) and a thiazole compound (N-cyclohexyl-2-benzothiazolylsulphenamide) as vulcanization accelerators, was further superior in abrasion resistance.

In contrast, the vulcanizate of Comparative Example 1, which did not contain any soft polyvinyl chloride as the blended rubber, was inferior in ozone resistance. Alternatively, the vulcanizate of Comparative Example 2, which had a soft polyvinyl chloride content of more than 50 mass % and an acrylonitrile-butadiene rubber content of more than 20 mass % in the blended rubber, was inferior in abrasion resistance. Yet alternatively, the vulcanizate of Comparative Example 3, which did not contain any acrylonitrile-butadiene rubber in the blended rubber, was inferior in abrasion resistance.

The results above demonstrate that the present invention provides a blended rubber and a blended rubber composition that give a vulcanizate superior in abrasion resistance and ozone resistance after vulcanization, and a vulcanizate prepared by vulcanizing the composition.

The vulcanizate according to the present invention can be used as industrial rubber products including automobile sealing materials, hose materials, molded rubber articles, gaskets, industrial cables, industrial conveyor belts, and the like.

The invention claimed is:

1. A blended rubber, comprising
   30 to 93 mass % of a chloroprene rubber,
   5 to 50 mass % of a soft polyvinyl chloride obtained by plasticizing a polyvinyl chloride with a plasticizer, and
   2 to 20 mass % of an acrylonitrile-butadiene rubber.
2. The blended rubber according to claim 1, wherein the polyvinyl chloride has a polymerization degree of 300 to 3000.
3. The blended rubber according to claim 1, wherein the soft polyvinyl chloride is obtained by plasticizing 100 parts by mass of the polyvinyl chloride with 30 to 150 parts by mass of the plasticizer.
4. The blended rubber according to claim 1, wherein the plasticizer is at least one compound selected from phthalic ester-, adipic acid-, chlorinated paraffin-, sebacic acid-, polyester-, phosphate ester-, polyether ester-, and trimellitic acid-based plasticizers.
5. The blended rubber according to claim 1, wherein the acrylonitrile-butadiene rubber contains acrylonitrile at a rate of 18 to 50 mass %.
6. A blended rubber composition, comprising the blended rubber according to claim 1 and
   a vulcanization accelerator.
7. The blended rubber composition according to claim 6, comprising the vulcanization accelerator in an amount of 0.5 to 5 parts by mass with respect to 100 parts by mass of the blended rubber.
8. The blended rubber composition according to claim 6, wherein the vulcanization accelerator is at least one compound selected from thiourea compounds, guanidine compounds, thiuram compounds, thiazole compounds, and peroxides.
9. The blended rubber composition according to claim 8, wherein the vulcanization accelerator contains a thiuram compound and a thiazole compound.
10. A vulcanizate obtained by vulcanizing the blended rubber composition according to claim 6.
11. The blended rubber according to claim 2, wherein the plasticizer is at least one compound selected from phthalic ester-, adipic acid-, chlorinated paraffin-, sebacic acid-, polyester-, phosphate ester-, polyether ester-, and trimellitic acid-based plasticizers.
12. The blended rubber according to claim 3, wherein the plasticizer is at least one compound selected from phthalic ester-, adipic acid-, chlorinated paraffin-, sebacic acid-, polyester-, phosphate ester-, polyether ester-, and trimellitic acid-based plasticizers.
13. The blended rubber according to claim 2, wherein the acrylonitrile-butadiene rubber contains acrylonitrile at a rate of 18 to 50 mass %.
14. The blended rubber according to claim 3, wherein the acrylonitrile-butadiene rubber contains acrylonitrile at a rate of 18 to 50 mass %.

15. The blended rubber according to claim 4, wherein the acrylonitrile-butadiene rubber contains acrylonitrile at a rate of 18 to 50 mass %.

16. A blended rubber composition, comprising the blended rubber according to claim 2 and a vulcanization accelerator.

17. A blended rubber composition, comprising the blended rubber according to claim 3 and a vulcanization accelerator.

18. A blended rubber composition, comprising the blended rubber according to claim 4 and a vulcanization accelerator.

19. A blended rubber composition, comprising the blended rubber according to claim 5 and a vulcanization accelerator.

20. A vulcanizate obtained by vulcanizing the blended rubber composition according to claim 7.

* * * * *